United States Patent [19]

Kodaka et al.

[11] 4,220,408
[45] Sep. 2, 1980

[54] SHUTTER RELEASE MECHANISM

[75] Inventors: Fujio Kodaka, Soka; Hidemichi Oonuma, Kasukabe, both of Japan

[73] Assignee: Kabushiki Kaisha Doi, Fukuoka, Japan

[21] Appl. No.: 58,896

[22] Filed: Jul. 19, 1979

[30] Foreign Application Priority Data

Jul. 19, 1978 [JP] Japan .............................. 53-99347[U]

[51] Int. Cl.² .......................... G03B 1/00; G03B 9/28; G03B 17/04; G03B 17/38
[52] U.S. Cl. .................................. 354/187; 354/213; 354/261; 354/266
[58] Field of Search ................ 354/187, 213, 261–269, 354/226, 241–242, 245–250

[56] References Cited
U.S. PATENT DOCUMENTS

| | | | |
|---|---|---|---|
| 1,091,666 | 3/1914 | Klein | 354/264 |
| 2,168,893 | 8/1939 | Aiken | 354/264 |
| 3,250,198 | 5/1966 | Spiessl | 354/261 |
| 3,713,373 | 1/1973 | Sato | 354/267 |

*Primary Examiner*—L. T. Hix
*Assistant Examiner*—Thomas H. Tarcza
*Attorney, Agent, or Firm*—James Creighton Wray

[57] ABSTRACT

A shutter release mechanism for a large camera designed to reduce a force required for actuation of the shutter thereby minimizing the possibility of camera shake during the shutter release operation. The mechanism is thus particularly useful for the bulb exposure operation. The shutter release mechanism comprises a pressure member movable between a pressing position and a restored position and adapted to actuate the shutter release member, a first hook member adapted to hook the pressure member at the restored position, a restoration lever movable between an operation position and an initial position and adapted to restore the pressure member from the pressing position to the restored position, and a second hook member adapted to hook the restoration lever at the initial position. The first hook member is adapted to release the pressure member when the shutter release button is pushed, whereupon the pressure member actuates the shutter release member. The second hook member is adapted to release the restoration lever when the shutter release button returns from the depressed position, whereupon the restoration lever pushes the pressure member back to the restored position.

8 Claims, 5 Drawing Figures

SHUTTER RELEASE MECHANISM

BACKGROUND OF THE INVENTION

1. Field of the Invention

This invention relates to a shutter release mechanism for a camera comprising a shutter, a shutter release member to actuate the shutter, a shutter release button and a shutter speed setting means.

2. Description of the Prior Art

In conventional shutter mechanisms, especially those for large cameras, mechanical parts are large and heavy, and consequently a large force is required for actuation of such parts. Particularly, it is necessary to exert a large force on the shutter release button to actuate the shutter. This tends to cause camera shake during the shutter release operation and adversely affects the efficiency of the operation. It has been proposed to reduce the force required for the operation of the shutter release button by providing a spring biased pressure member which is adapted to be actuated, upon the touch of the shutter release button, to exert a pressure on a shutter release member to open the shutter. This system is useful for an automatic shutter operation in which the shutter, once opened by the spring action of the pressure member, automatically closes after a short period of time predetermined by a shutter speed setting means. However, this system does not work for a manual bulb exposure operation, i.e. when the shutter speed setting means is set for a bulb exposure operation, wherein the shutter has to be kept open while the shutter release button is kept depressed and it has to be immediately closed when the shutter release button is set free from the pushing pressure. The above mentioned spring biased pressure member serves to open the shutter but does not serve to close the shutter and therefore it is not by itself useful for the bulb exposure operation. For the proper bulb operation, it is necessary to provide a further means whereby a shutter release member is returned to the initial position when the shutter release button is set free to return from the depressed position.

BRIEF SUMMARY OF THE INVENTION

Accordingly, it is a primary object of the invention to provide a shutter release mechanism which requires a less force for the operation of the shutter release button and which is useful not only for an automatic shutter operation but also for a manual bulb exposure operation.

Thus, the present invention provides a shutter release mechanism for a camera comprising a shutter, a shutter release member, a shutter release button and a shutter speed setting means, which comprises a pressure member movable between a pressing position and a restored position and adapted to actuate the shutter release member; a first hook member adapted to hook the pressure member at the restored position; a restoration lever movable between an operation position and an initial position and adapted to restore said pressure member from the pressing position to the restored position; and a second hook member adapted to hook the restoration lever at the initial position. The first hook member is adapted to release the pressure member when the shutter release button is pushed i.e. in response to the depression of the shutter release button, whereupon the pressure member moves to the pressing position thereby actuating the shutter release member to open the shutter. The second hook member is adapted to release the restoration lever when the shutter release button returns from the pushed position i.e. in response to the restoration of the shutter release button from the depressed position, whereupon the restoration lever moves to the operation position thereby restoring the pressure member from the pressing position to the restored position.

In a preferred embodiment, a set ring is provided which has a first protrusion and a second protrusion and is adapted to be operable such that the first protrusion acts on the first hook member to disengage it from the pressure member when the shutter release button is pushed and the second protrusion acts on the second hook member to disengage it from the restoration lever when the shutter release button returns from the pushed position. The set ring also has a third protrusion and is adapted to be operable such that the third protrusion pushes the restoration lever from the operation position back to the initial position when an exposed film is wound up i.e. in response to the film winding operation. The set ring is connected by a cable to a bobbin which is adapted to transmit via the cable the depression and restoration movements of the shutter release button to the set ring thereby operating the set ring. The bobbin is also adapted to transmit via the cable the film winding motion to the set ring thereby operating the set ring with its third protrusion pushing the restoration lever back to the initial position. The set ring is mounted on an object lens box while the bobbin is mounted on the camera body, and the object lens box and the camera body are connected by bellows. The cable extends from the bobbin to the set ring via a pulley train.

It is also preferred to provide a lock means for a film winding lever. The lock means is normally held to prevent the film winding lever from rotation for film winding operation. It is adapted to be released to permit the rotation of the film winding lever when the shutter release button returns from the depressed position i.e. in response to the restoration of the shutter release button from the depressed position. The lock means comprises a stop cam integrally connected with the film winding lever for rotation therewith, and a lock lever which is spring biased to be normally in engagement with the stop cam to prevent it from rotation. The lock lever is adapted to be disengaged from the stop cam when the shutter release button returns from the depressed position i.e. in response to the restoration of the shutter release button.

BRIEF DESCRIPTION OF THE DRAWINGS

A preferred embodiment of the present invention will now be described with reference to a bellow-type camera provided with a lens shutter, as shown in the accompanying drawings.

DETAILED DESCRIPTION OF THE INVENTION

Figure 1:
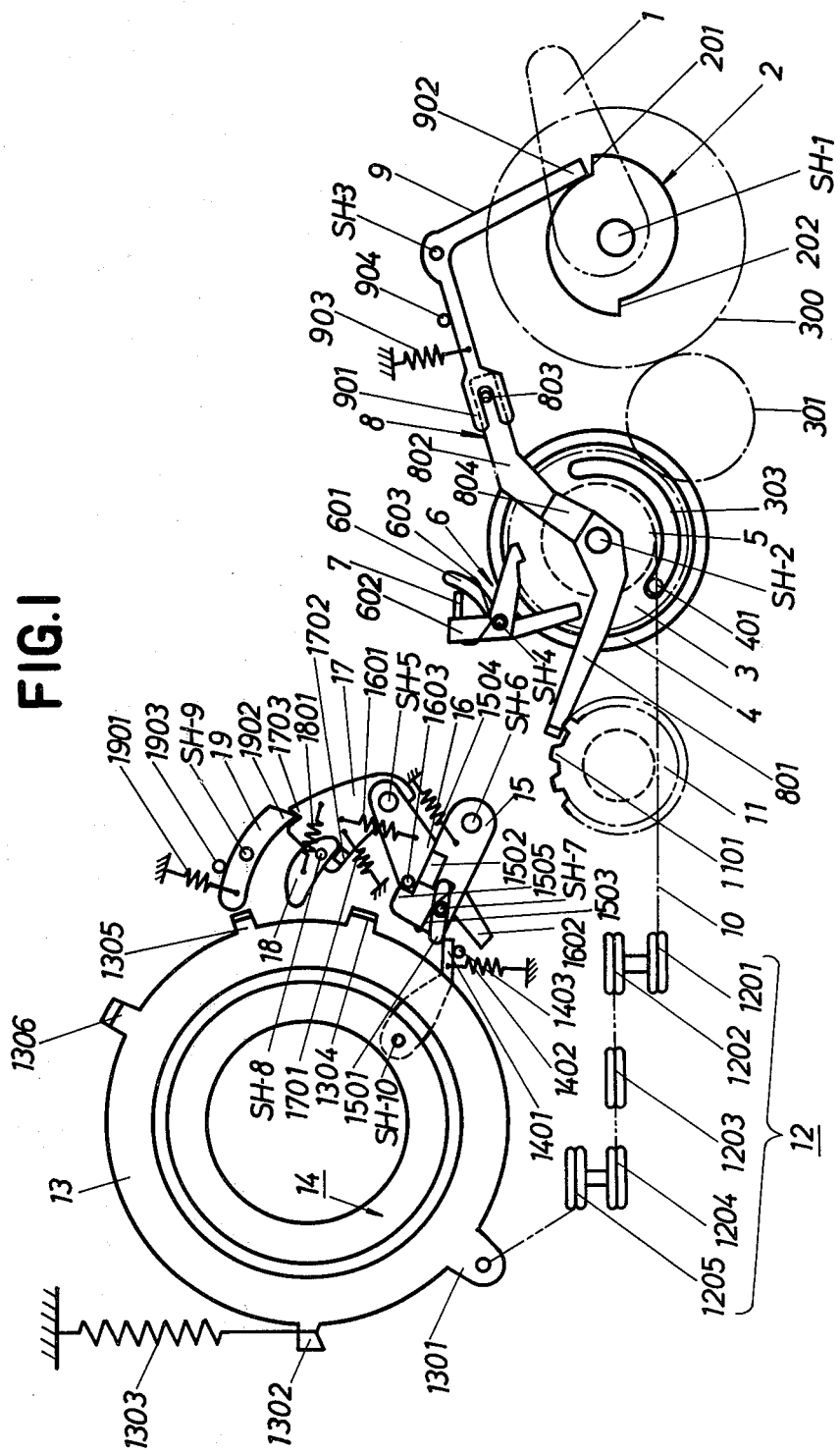
FIG. 1 shows a mechanism of the present invention wherein a film winding lever is in a wound up position.
Figure 5:
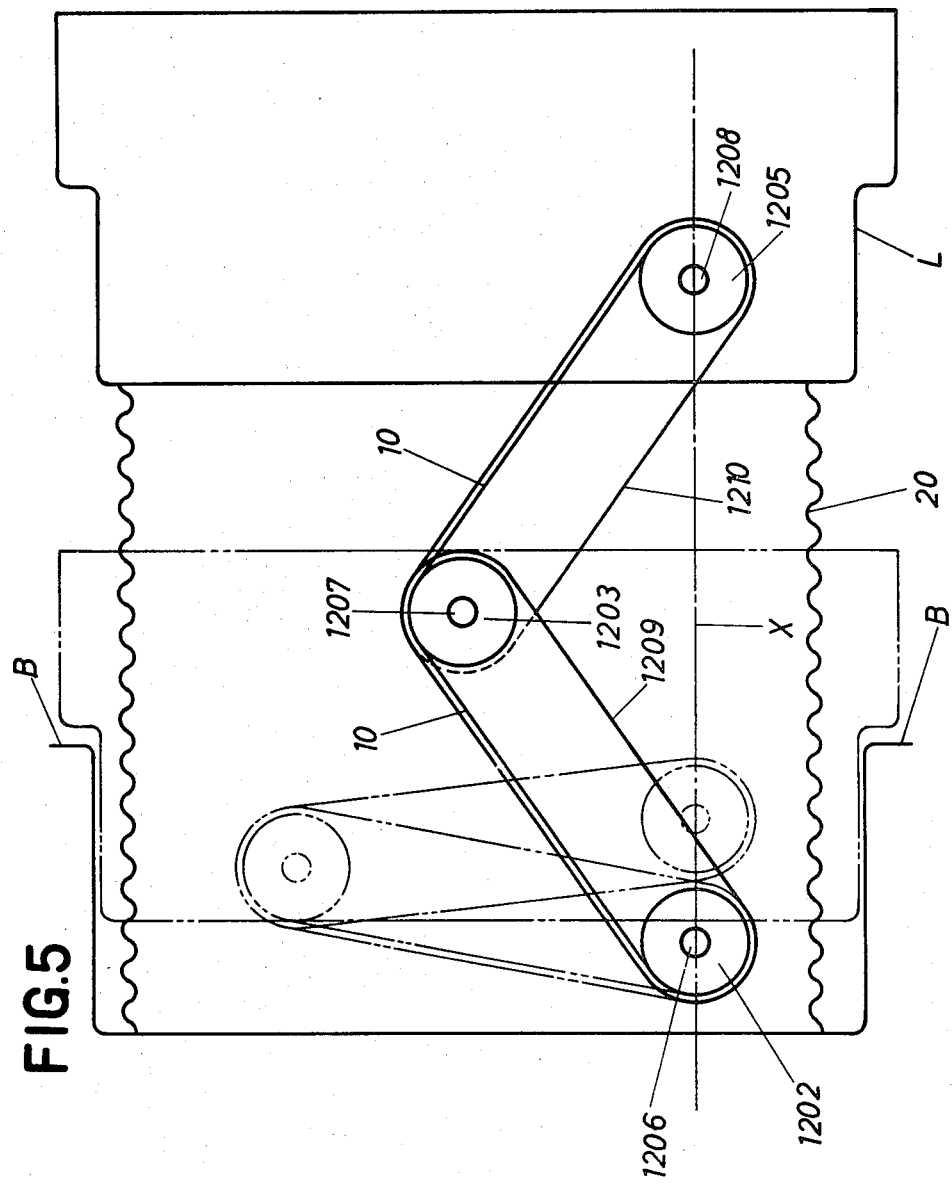
FIG. 5 shows an arrangement of a pulley train.

Referring to FIG. 1, the main part of a camera provided with a shutter release mechanism of the present invention is shown in a state where a winding lever 1 is in a wound up position. Reference numeral 1 is the winding lever and numeral 2 is a stop cam with steps 201 and 202 to prevent the winding of an unexposed film. SH-1 is a rotary shaft pivoted to the camera body and having attached thereto the winding lever 1, the stop cam 2 and a first gear wheel 300. Numeral 301 is an idle gear to transmit the rotation of the first gear wheel 300 to a second gear wheel 3. The second gear wheel 3 is rotatably supported by a shaft SH-2 and it is provided with an arcuate slot 303 which is engaged by a control pin 401 attached to a control plate 4 which is also rotatably supported by the shaft SH-2. Numeral 5 is a cable winding bobbin rotatably supported by the shaft SH-2 and it is rotatable integrally with said control plate 4 to wind up a cable 10 connected to a set ring 13 which will be described later. Numeral 6 is a lever unit for regulating the control plate and which comprises a first lever 601 which withholds the control pin 401 from shifting its position until the start of the release operation of the shutter, and a second lever 602 which withholds the control pin from shifting its position after the release of the shutter until the start of the returning movement of the shutter release button. The first and second levers are rotatably supported by a shaft SH-4 and they are spring biased by a spring 603 towards each other to hold an operation lever 7 inbetween. The operation lever is adapted to move to the right when a shutter release button (not shown) is pushed and to return to the initial position when the shutter release button is restored. Numeral 8 is a stop lever adapted to rotate clockwise about the shaft SH-2 when pushed by the control pin 401 of the control plate 4 which rotates upon the release of the shutter. The stop lever 8 has at its one end an arm 801 which engages a film counter 11 and at its other end an arm 802 having a pin 803 which engages a forked portion 901 of a lock lever 9 for controlling the rotation of the winding lever 1. The arm 802 has a bent portion 804 and a central part of the arm 802 engages the control pin 401. The lock lever 9 is rotatably supported by a shaft SH-3 and spring biased clockwise by a torsion spring 903 to rest normally against a stop pin 904. The lever 9 has, in addition to the forked portion 901, an arm 902 which controls the rotation of the winding lever 1 through engagement with the steps 201 and 202 of the stop cam 2. Numeral 11 is a film counter having on its circular periphery teeth 1101. Normally, one of the teeth is in engagement with the arm 801 of the stop lever 8. When the stop lever 8 rotates in response to the shutter release operation, the film counter rotates to bring the next tooth in engagement with the lever thereby advancing the film for one frame. Numeral 12 designates a pulley train mounted on a side of the bellows and adapted to transmit the action from a camera body B to an object lens box L provided at the front of the bellows. A cable 10 extends between a pulley 1201 and the bobbin 5, between a pulley 1205 and a projection 1301 on the set ring and via pulleys 1202, 1203 and 1204 as shown in FIG. 5.

Numeral 13 is a set ring which is spring biased clockwise by a torsion spring 1303 provided between a hook 1302 and the object lens box L. The set ring 13 has protrusions 1304, 1305 and 1306 which will be described later with reference to the operation of the embodiment. Numeral 14 generally designates a shutter ring which represents a conventional shutter device. Numeral 1401 is a shutter release member rotatably supported by a shaft SH-10 and spring biased clockwise by a torsion spring 1402. This shutter release member 1401 normally rests against the stop pin 1403. This shutter device 14 is the one conventionally used for a shutter of a large camera where the shutter speed is adjustable by means of a shutter speed ring (not shown) and the shutter release member 1401 rotates anticlockwise to release the shutter. This device 14 is charged by the winding operation of the winding lever 1. Numeral 15 is a first hook member having a hook portion 1505 which anchors a pressure member 16 to prevent it from clockwise rotation. The first hook member is rotatably supported by a shaft SH-6 and spring biased clockwise by a torsion spring 1504. A release pin 1501 mounted on the hook member 15 is rotatably supported by a shaft SH-7 and spring biased anticlockwise by a spring 1503. Its rotation is restricted by a stood portion 1502 of the first hook member and is allowed to rotate only clockwise. Numeral 16 is a pressure member with its front end functioning to actuate the shutter release member 1401 and it is rotatably supported by a shaft SH-5 and spring biased clockwise by a torsion spring 1601. The pressure member 16 has a pin 1603 which engages the first hook member 15. Thus, the first hook member is adapted to hook the pressure member 16 at the restored position. Numeral 17 is a restoration lever rotatably supported by a shaft SH-5 in a manner similar to the pressure member 16 and spring biased anticlockwise by a torsion spring 1701. Mounted on the restoration lever 17 is a charge member 18 rotatably supported by a shaft SH-8 and spring biased clockwise by a torsion spring 1801. The movement of the charge member 18 is restricted by a stood portion 1702 of the restoration lever 17 and, in the state shown in FIG. 1, allowed to rotate only anticlockwise. The restoration lever has at its front end a recess 1703 for engagement with a second hook member 19, which will be described later. Further, a torsion spring 1601 is provided between the pressure member 16 and the restoration lever 17 to bias them towards each other. Numeral 19 is a second hook member having a front end to engage the recess 1703 of the restoration lever 17 thereby to prevent the rotation of the latter. The second hook member is rotatably supported by a shaft SH-9 and spring biased clockwise by a torsion spring 1901. Numeral 1903 is a stop pin to prevent the rotation of the second hook member 19.

Now, the operation of the mechanism of the present invention will be described.

Figure 2:
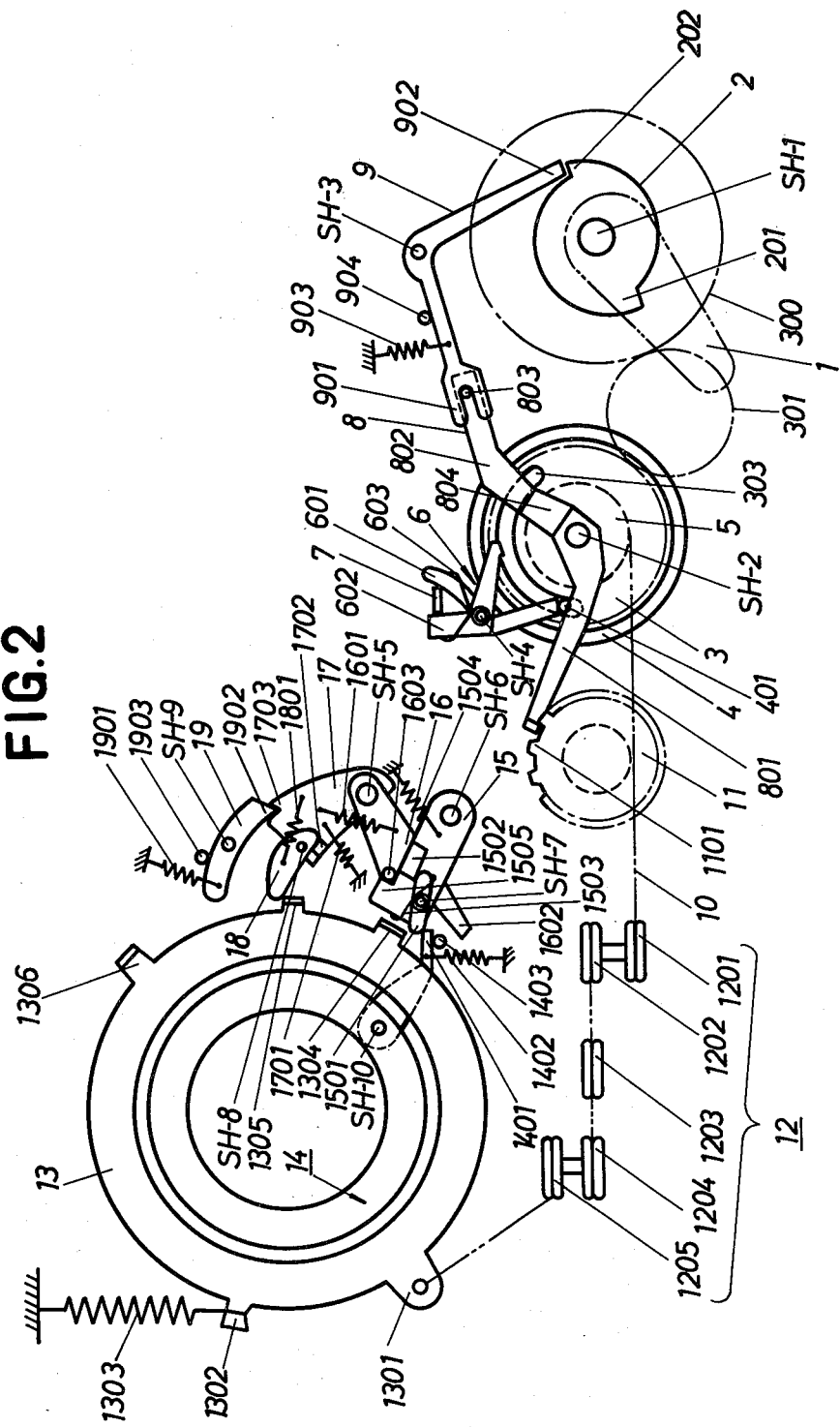
FIG. 2 shows the same mechanism with the winding lever restored in the initial position.

Referring to FIG. 2, the winding lever 1 has, after completion of the winding operation, returned to the initial position and the mechanism is ready for taking a picture. The positioning of various parts of the shutter device is mostly as shown in FIG. 1. However, due to the restoration of the winding lever 1, the gear wheel 3 is turned almost in a half revolution with a consequential displacement of the arcuate slot 303, and the control plate 4, under a clockwise rotational force imparted thereto through the cable 10, rotates clockwise until its pin 401 comes into contact with the front end of the first lever 601. The bobbin 5 likewise rotates in a corresponding degree and the set ring 13 rotates clockwise in a degree corresponding to the length of the cable thereby dispensed. At the same time, the protrusion 1305 of the set ring 13 pushes the charge member 18 and let it rotate and then stops at a position beyond it.

Figure 3:
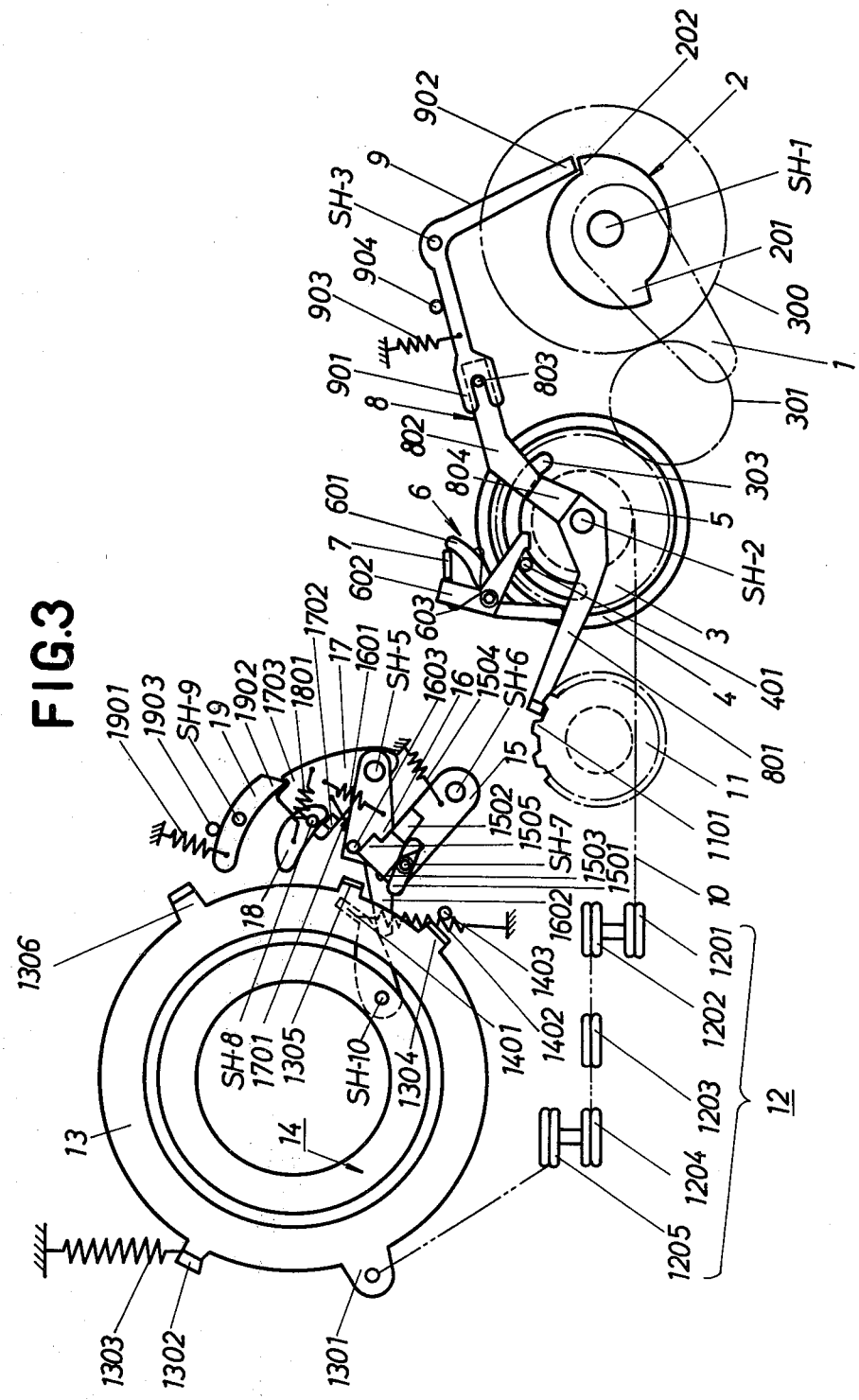
FIG. 3 shows the mechanism in a state where a shutter release button is pushed.
Figure 4:
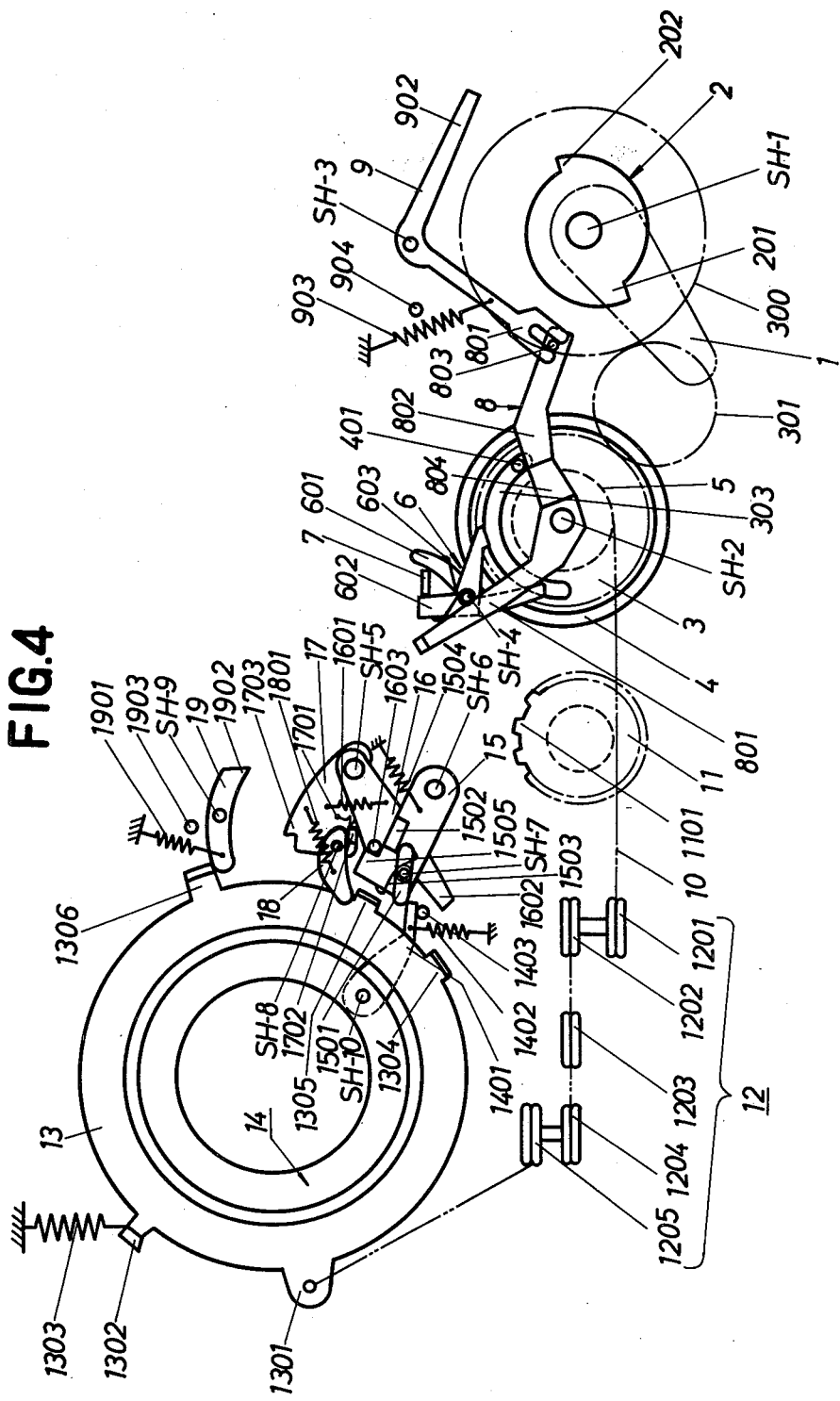
FIG. 4 shows the mechanism in a state where the shutter release button is restored to the initial position.

The shutter release button is then pushed to take a picture, whereupon the mechanism takes a position as shown in FIG. 3. Namely, the operation lever 7 moves to the right whereby the first lever 601 is disengaged from the control pin 401 and the second lever 602 comes in the path of the control pin 401. The bobbin 5 integrally attached to the control plate 4 with the control pin 401 rotates clockwise, under the spring action of the spring 1303 of the set ring 13 transmitted by the cable 10, until the control pin 401 comes into contact with the second lever 602. The cable 10 unwound from the bobbin 5 is pulled to the left through the pulley train 12 and the set ring 13 rotates clockwise, whereupon the protrusion 1304 of the set ring 13 strikes the release pin 1501 thereby to rotate the first hook member 15 anticlockwise and disengage it from the pressure member 16. The pressure member 16 then rotates clockwise and its front end 1602 pushes the shutter release member 1401 against the spring action of the spring 1402, whereby the shutter release member 1401 is displaced and the shutter device 14 is actuated and operates with a shutter speed set by the cameraman. When the shutter speed setting means is set at a speed other than at the bulb exposure, the shutter is open for the predetermined period of time and closes to complete the picture taking operation. In the case of the bulb exposure, however, the shutter is open and is maintained to be open until a proper next operation of the set ring 13 has been done. Namely, the shutter release button is set free from the pushing pressure and returns to the initial position, whereupon the mechanism takes a position as shown in FIG. 4. Firstly, the operation lever 7 returns to the initial position, i.e. the position shown in FIG. 1, and the second lever 602 rotates anticlockwise, whereupon the control pin 401 is set free from the second lever and rotates clockwise. The control pin 401 comes into contact with the stop lever 8 and pushes it thereby rotating it clockwise, whereupon the lock lever 9 engaged with the stop lever 8 at a pin 803 is rotated anticlockwise and the arm 902 of the lock lever 9 is then disengaged from the step 202 of the stop cam 2 thereby allowing the winding operation of the winding lever 1 as shown in FIG. 4. At the same time, on the shutter device side, the set ring 13 rotates clockwise so that the protrusion 1306 of the set ring 13 pushes the second hook member 19 to rotate the latter anticlockwise, whereupon the hook member 19 is disengaged from the restoration lever 17. The restoration lever 17 thus set free from the hook member 19, rotates anticlockwise by the spring action of the spring 1701 and with its stood portion 1702 pushes the pressure member 16 united thereto by the spring 1601, to rotate it to the initial position, whereupon the release member 1401 freed from the pressure of the pressure member 16 returns to the initial position by the spring action of the spring 1402. The pin 1603 of the pressure member 16 engages the hook portion 1505 of the first hook member 15 and the pressure member is thus charged again. Where the shutter speed setting means is set at the bulb exposure, the shutter is closed upon the completion of the returning operation of the pressure member to the initial position. Namely, the shutter opens when the release button is pushed and it closes when the release button returns to the initial position, which is so-called "bulb exposure operation".

The picture taking operation has been completed by the procedure described above. Subsequently, the winding lever 1 is wound up as shown in FIG. 1, whereby the second gear wheel 3 is rotated anticlockwise through the first gear wheel 300 and idle gear 301, and the control pin 401 is rotated anticlockwise from the position wherein the pin is anchored at the end of the slot 303 of the gear wheel 3. The first lever 601 is located in the path of the pin 401. The pin pushes the first lever aside against the spring force of the spring 603 and passes it to return to the initial position. As the control pin 401 returns to the initial position, the stop lever 8 and the lock lever 9 return to their respective initial positions as shown in FIG. 1 by the spring action of the spring 903. Then the winding lever 1 is returned to the initial position, whereupon the arm 902 of the lock lever 9 engages the step 202 of the stop cam 2 thereby preventing a further rotation of the winding lever 1 until the shutter release operation is repeated. At the same time, on the shutter device side, the shutter device 14 is charged by a charging means (not shown) which is operable in response to the operation of the winding lever 1. Further, as the control pin 401 rotates anticlockwise, the cable 10 is wound on the bobbin 5 and the set ring 13 is rotated anticlockwise against the spring action of the spring 1303. The protrusion 1305 pushes the charge member 18 to rotate it clockwise against the spring action of the spring 1701 until the restoration lever 17 engages the second hook member 19, and the protrusion 1305 further advances beyond the charge member 18. Whereas, the protrusion 1304 pushes the release pin 1501 to rotate it clockwise against the spring action of the spring 1503 and further advances beyond the release pin. The shutter device is thus restored to be ready for taking a picture as shown in FIG. 2.

FIG. 5 shows an arrangement of the pulley train 12 of the preferred embodiment of the present invention.

The solid lines indicate the state in which the object lens (not shown) is pulled out from the camera body to be ready for taking pictures and the alternate long and two short dashes lines indicate the state in which the object lens is stowed. B designates the camera body, and L designates an object lens box. X is a center line which is in parallel with the light axis of the object lens and which passes through the center of a shaft 1206 which will be described later. Numeral 20 is bellows. Numeral 1209 is a supporting arm for pulleys having one end rotatably mounted on a shaft 1206 which is rotatably attached to the camera body and the other end of the supporting arm 1209 is rotatably connected to one end of a supporting arm 1210 by means of a shaft 1207. The other end of the supporting arm 1210 is rotatably supported by a shaft 1208 which is rotatably attached to the object lens box L. The pulleys 1201 and 1202 and pulleys 1204 and 1205 are integrally connected by the shafts 1206 and 1208, respectively. The pulley 1202 is secured to the shaft 1206 on the supporting arm 1209 and the pulley 1205 is secured to the shaft 1208 on the supporting arm 1210. The pulley 1205 is movable on the center line X which is parallel to the light axis of the object lens, whereas the shaft 1207 of the pulley 1203 is movable on the track of the vertex of an isosceles triangle formed by the supporting arms 1209 and 1210. As shown in FIG. 5, the cable 10 is put on the pulleys in such a manner that it extends via the upper side of the pulley 1202, over the upper side of the pulley 1203 and via the upper side of the pulley 1204 which is located beneath the pulley 1205, whereby the length of the cable 10 in the picture taking position as shown by the solid lines is the same as that in the stowed position as shown by the alternate long and two short dashes lines. Thus, the cable 10 does not shift relative to the pulleys even when the object lens box L is moved from the picture taking position to the stowed position in the camera body B. Accordingly, the charging of the shutter device 14 and the restoration lever 17 can readily be conducted in either position without shifting the winding phase.

Having thus described the invention, it should be noted that according to the present invention, as opposed to the conventional shutter device wherein the shutter release member is operated directly by the shutter release button, the release member is operated via a spring biased lever which is actuated by the shutter release button, whereby the aforementioned problems inherent to the bulb exposure operation can be overcome. The force required for the shutter release button is thereby considerably reduced.

The present invention is not limited to the above mentioned embodiment wherein the shutter device is operated via a cable, but covers various embodiments wherein the first hook member is released when the shutter release button is pushed and the second hook member is released when the shutter release button returns to the initial position. For instance, the hook members may be adapted to be actuated directly by the shutter release button.

A further advantage of the present invention is that the shutter release is conducted when the shutter release button is pushed and the film winding lock of the winding lever 1 is set free when the shutter release button returns to the initial position thereby ensuring that the film winding lock is set free upon the completion of the shutter release operation. With the conventional cameras, it is usual that the shutter release and the release of the film winding lock are simultaneously, or with a slight lag in timing, conducted at the time of pushing the shutter release button. A discrepancy in the timing of the shutter release and the release of the film winding lock in the conventional cameras tends to lead undesirable results such that the film winding can not be conducted properly even when the shutter release is conducted properly, or the shutter does not operate properly even when the film winding lock is released properly whereby an unexposed film is wound up. These failures may be minimized by the mechanism of the present invention wherein the shutter release takes place when the shutter release button is pushed and the film winding lock is released when the release button returns to the initial position.

What is claimed is:

1. A shutter release mechanism for a camera comprising a shutter, a shutter release member to actuate the shutter, a shutter release button and a shutter speed setting means, which comprises:
   a pressure member movable between a pressing position and a restored position and adapted to actuate the shutter release member;
   a first hook member adapted to hook the pressure member at the restored position;
   a restoration lever movable between an operation position and an initial position and adapted to restore said pressure member from the pressing position to the restored position; and
   a second hook member adapted to hook the restoration lever at the initial position;
   said first hook member being adapted to release the pressure member in response to the depression of the shutter release button, whereupon the pressure member moves to the pressing position thereby actuating the shutter release member; and
   said second hook member being adapted to release the restoration lever in response to the restoration of the shutter release button from the depressed position, whereupon the restoration lever moves to the operation position thereby restoring said pressure member from the pressing position to the restored position.

2. A shutter release mechanism as claimed in claim 1 which comprises a set ring having a first protrusion and a second protrusion and adapted to be operable such that the first protrusion acts on the first hook member to disengage it from the pressure member when the shutter release button is pushed and the second protrusion acts on the second hook member to disengage it from the restoration lever when the shutter release button returns from the pushed position.

3. A shutter release mechanism as claimed in claim 2 wherein the set ring has a third protrusion and is adapted to be operable such that the third protrusion pushes the restoration lever from the operation position back to the initial position in response to a film winding operation.

4. A shutter release mechanism as claimed in claim 2 wherein the set ring is connected by a cable to a bobbin which is adapted to transmit via the cable the pushing and returning motion of the shutter release button to the set ring.

5. A shutter release mechanism as claimed in claim 3 wherein the set ring is connected by a cable to a bobbin which is adapted to transmit via the cable the film winding motion to the set ring.

6. A shutter release mechanism as claimed in claim 4 or 5 wherein the set ring is mounted on an object lens box, the bobbin is mounted on a camera body, the object lens box and camera body are connected by bellows, and the cable extends from the bobbin to the set ring via a pulley train.

7. A shutter release mechanism as claimed in claim 1 which further comprises a lock means for a film winding lever, said lock means being normally held to prevent the film winding lever from rotation for film winding operation and adapted to be released to permit the rotation of the film winding lever in response to the restoration of the shutter release button from the depressed position.

8. A shutter release mechanism as claimed in claim 7 wherein said lock means comprises a stop cam integrally connected with the film winding lever for rotation therewith, and a lock lever biased to be normally in engagement with the stop cam to prevent it from rotation, said lock lever being adapted to be disengaged from the stop cam in response to the restoration of the shutter release button from the depressed position.

* * * * *